United States Patent [19]

Grunewalder et al.

[11] Patent Number: 4,913,972
[45] Date of Patent: Apr. 3, 1990

[54] TRANSPARENT COATING SYSTEM FOR PROVIDING LONG TERM EXTERIOR DURABILITY TO WOOD

[75] Inventors: John F. Grunewalder, Glenshaw; Mark A. Harley, Oakmont; Alan J. Kaylo; Paul J. Prucnal, both of Pittsburgh, all of Pa.

[73] Assignee: PPG Industries, Inc., Pittsburgh, Pa.

[21] Appl. No.: 315,016

[22] Filed: Feb. 23, 1989

Related U.S. Application Data

[63] Continuation of Ser. No. 11,958, Feb. 6, 1987, abandoned.

[51] Int. Cl.$^4$ .......................... B05D 3/10; B32B 27/40
[52] U.S. Cl. ................................ 428/425.5; 427/303; 427/355; 427/408; 428/424.8; 428/447; 428/449; 428/452; 428/513; 428/523; 428/537.1
[58] Field of Search .................... 427/325, 408, 303; 428/425.1, 425.5, 447, 448, 452, 424.8, 513, 523, 537.1

[56] References Cited

U.S. PATENT DOCUMENTS

| | | | |
|---|---|---|---|
| 3,900,687 | 8/1975 | Meader et al. | 427/407.1 |
| 4,386,134 | 5/1983 | Puhringer | 428/447 |
| 4,404,239 | 9/1983 | Grunewalder | 427/393 |
| 4,429,082 | 1/1984 | Lee et al. | 525/426 |
| 4,603,064 | 7/1986 | Kunia | 427/408 |

OTHER PUBLICATIONS

"Chemistry of Weathering and Protection", Feist et al., *The Chemistry of Solid Wood*, Ch. II, American Chemical Society, 1984, pp. 402-451.
"The Outdoor Finish. How and When to Paint or Stain", Feist, *Fine Homebuilding*, Jun./Jul., 1985, pp. 54-55.
"Natural Finishes for Exterior Timer", *Pigment and Resin Technology*, Apr. 1986, pp. 10-14.
"Inorganic Surface Treatments for Weather-Resistant Natural Finishes", Black et al., U.S.D.A. Forest Service Research Report, vol. 232, 1974.
"Outdoor Wood Finishes", William C. Feist, *Fine Woodworking*, Sep./Oct., 1983, pp. 66-67.
"Microscale Effects of Ultraviolet Irradiation and Weathering on Redwood Surface and Clear Coatings", Victor Miniotti, Journal of Paint Technology, vol. 41, No. 531, Apr., 1969, pp. 275-284.
"12 Weathering of Wood in Structural Uses", William C. Feist, reprinted from symposium entitled Structural Use of Wood in Adverse Environments, Von Nostrand Rheinol & Co., N.Y., 1982, pp. 156-178.

*Primary Examiner*—Janyce Bell
*Attorney, Agent, or Firm*—Thomas M. Breininger

[57] ABSTRACT

Disclosed is a method for providing a wood substrate with durability against weathering comprising at least two steps (A) and (B). Step (A) consists of appying to the wood substrate a transparent treatment comprising an organosilicon-containing compound having at least one hydrolyzable silyl group in a carrier for said compound. Step (B) consists of thereafter coating the wood substrate with a transparent, film-forming, coating composition. The coating composition is characterized in that a transparent free film from the coating composition retains an elongation of at least 20 percent after at least 1,000 hours exposure in a Xenon Weatherometer.

16 Claims, No Drawings

TRANSPARENT COATING SYSTEM FOR PROVIDING LONG TERM EXTERIOR DURABILITY TO WOOD

This is a continuation of application Ser. No. 07/011,958, filed Feb. 6, 1987 now abandoned.

BACKGROUND OF THE INVENTION

Solid wood substrates for use in outdoor applications, such as in exterior building materials of various types, typically are protected from the effects of weathering by painting the wood with a conventional paint or by staining the wood with, for example, a pigmented opaque stain. While coatings which are opaque, or substantially so, can afford good protection against weathering, particularly against the combined effects of moisture and ultraviolet light, they do not allow the natural beauty of the wood, such as the grain of the wood, to be seen. It has long been desirable to provide a coating system for exterior wood which is transparent, or essentially so, and yet still affords excellent protection against weathering. However, this object has been elusive with respect to achieving relatively long term exterior durability in a transparent coating system for wood. For example, wood which has been coated with a conventional, clear coating such as a conventional air dry urethane, alkyd or spar varnish often exhibits signs of deterioration in both the coating and, more importantly, in the underlying wood itself, in as little as one year from the time of application.

It is observed in the article, "Microscale Effects Of Ultraviolet Irradiation And Weathering On Redwood Surfaces And Clear Coatings," *Journal Of Paint Technology*, Vol. 41, No. 531, page 275 ff, (April, 1969) that, "Most conventional clear coatings strongly absorb ultraviolet radiation, which leads to their rapid degradation. Then degradation of the wood surface beneath may follow. When clear coatings are used that are transparent to ultraviolet radiation, the coating may be very stable, but the wood surface may then be rapidly degraded. The photodegradation of the wood surface, therefore, may be an important factor in the relatively short life of clear coatings that transmit all or only a portion of the ultraviolet wavelengths of solar radiation."

Moreover, it was observed in the aforesaid article, that a silicone resin which "was known to transmit considerably more of the ultraviolet radiation than the two varnishes" (a phenolic varnish and a polyurethane varnish), offered little if any protection from degradation upon exposure to a source of ultraviolet light.

It is taught in the article, "Natural finishes for exterior timber," *Pigment And Resin Technology*, April 1986, page 10 ff, that "Any wood exposed to sunlight and rain will in time lose its original colour. The change is due partly to loss of water-soluble extractives, which occurs quite rapidly, but mainly to the breakdown of lignin and other components in the wood by ultra-violet components in sunlight, and subsequent removal of the breakdown products by rain;" and further with respect to clear varnishes as follows.

"Fully exposed varnish often has a short life, principally because of the tendency of most types to embrittle by weathering, so that in time they disintegrate under the stresses imposed by a wood substrate. Ultra-violet light can pass through the film and bleach or degrade the underlying wood surface. Many cases of premature varnish failure can be traced to detachment of this degraded wood surface layer; this is often brought about by water getting behind the film where end grain is exposed, for example at joints or unstopped nail holes, or as a result of damage."

"These shortcoming are common to all of the varnishes commonly used. Polyurethanes of the moisture-curing and two-pack types give good service indoors but the stresses within such a [sic] strong coatings are sufficient to cause peeling when the outermost layer of wood under the film0382 become degraded; the remnants of the coating are difficult to strip either mechanically or chemically. Unless there are exceptional requirements for toughness and abrasion resistance, polyurethanes are therefore best avoided outdoors. Marine or yacht varnishes have also not been found satisfactory under conditions of full exposure on buildings."

In the article, "Chemistry of Weathering and Protection," *The Chemistry Of Solid Wood*, Chapter 11, published 1984 by the American Chemical Society, page 435 ff, it is taught that, "The addition of colorless UV light absorbers to clear finishes has found only moderate success to help retain the natural color and original surface structure of wood . . . Opaque pigments found in paints and stains generally provide the most effective and long-lasting protection against light . . . Even when using relatively durable, clear, synthetic resin varnishes, the weatherproof qualities of the wood - varnish system are still limited because UV light penetrates the transparent varnish film and gradually degrades the wood under it . . . Eventually, the varnish begins to flake and crack off, taking with it fibers of the wood that have been degraded photochemically . . ." [citations to references deleted].

It is an object of the present invention to provide a method for providing a wood substrate with long-term durability against weathering and still allow the natural appearance of the underlying wood to be visible. Other objects of the invention will become apparent to the reader infra.

SUMMARY OF THE INVENTION

The present invention is for a method for providing a wood substrate with long-term durability against weathering. The method comprises at least two steps (A) and (B). Step (A) consists of applying to the wood substrate a transparent treatment containing an organosilicon-containing compound having at least one hydrolyzable silyl group in a carrier for the organosilicon-containing compound. Step (B) consists of thereafter coating the wood substrate with a transparent, film-forming, coating composition. The components of the coating composition form a transparent, durable continuous coating on the wood substrate. The coating composition is characterized in that a transparent free film from the coating composition retains an elongation sufficient to insure long term durability. Based on experimental testing, it is believed that the transparent free film should retain an elongation of at least 20 percent, and preferably retains a tensile strength of at least 2,000 pounds per square inch, after at least 1,000 hours exposure in a Xenon Weatherometer.

The present invention also is for a wood substrate having firmly adhered thereto a material comprising: a dry layer of the transparent treatment and, immediately above and firmly adhered thereto, the transparent coating from the aforesaid film-forming, coating composition.

DETAILED DESCRIPTION OF THE INVENTION

The present invention is for a method of providing a wood substrate with durability against weathering comprising: (A) applying to the wood substrate a transparent treatment comprising an organosilicon-containing compound having at least one hydrolyzable silyl group in a carrier for the organosilicon-containing compound; and thereafter (B) coating the wood substrate with a transparent, film-forming, coating composition whereby the components of the coating composition form a transparent, durable continuous film. A coating composition suitable for use in the method of the invention is characterized in that a transparent free film from the coating composition retains an elongation of at least 20 percent, preferably at least 50 percent, and more preferably at least 100 percent after at least 1,000 hours exposure in a Xenon Weatherometer. A transparent free film from a preferred composition also retains a tensile strength of at least 2,000 pounds per square inch, preferably at least 4,000 pounds per square inch, after at least 1,000 hours exposure in the Xenon Weatherometer. Generally, the film-forming binder of the coating composition is essentially free, and preferably completely free, of unsaturated fatty acid or unsaturated derivatives of unsaturated fatty acid such as, for example, unsaturated drying oil.

The transparent treatment for the method of the invention comprises an organosilicon-containing compound having at least one hydrolyzable silyl group. The organosilicon-containing compound can be incorporated in any suitable carrier for the organosilicon-containing compound.

The organosilicon-containing compound has a silicon atom which silicon atom is directly bonded to a group Y wherein Y represents a hydrolyzable group.

Examples of groups which can represent the hydrolyzable group Y bonded directly to Si include —OR$^1$,

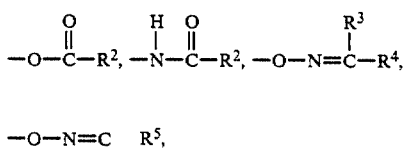

—O—N═C R$^5$, and the monohydroxy and/or cyclic C$_2$–C$_3$ residue of a 1,2- or 1,3-glycol, wherein R$^1$ represents C$_1$–C$_3$ alkyl, preferably C$_1$–C$_2$ alkyl, and more preferably methyl, R$^2$ independently represents H or C$_1$–C$_4$ alkyl, R$^3$ and R$^4$ independently represent H, C$_1$–C$_4$ alkyl, C$_6$–C$_8$ aryl and R$^5$ represents C$_4$–C$_7$ alkylene.

Particularly preferred hydrolyzable silyl groups Y include —OR$^1$ wherein R$^1$ is a C$_1$–C$_3$ alkyl group.

A wide variety of organosilicon-containing compounds containing at least one hydrolyzable silyl group may be employed in the transparent treatment for the method of the invention. The disclosure in the following sections (a) through (d) regarding organosilicon-containing compounds containing at least one hydrolyzable silyl group should be considered to be merely illustrative of such compounds which may be employed.

(a) Illustrative organosilicon-containing compounds for the treatment composition include reaction products of an amino-functional silicon-containing compound and an amine reactive (meth)acrylyl-containing compound. Examples of suitable amino-functional silicon-containing compounds include gamma-aminopropyltrimethoxysilane, gamma-aminopropyltriethoxysilane, N-beta(aminoethyl)gamma-aminopropyltrimethoxysilane, beta-aminoethyltriethoxysilane, gamma-aminopropylmethyldiethoxysilane, gamma-aminopropylethyldiethoxysilane, gamma-aminopropylphenyldiethoxysilane, delta-aminobutyltriethoxysilane and delta-aminobutylethyldiethoxysilane. Examples of suitable amine reactive (meth)acrylyl-containing compounds include hydrocarbonpolyol poly(meth)acrylates, saturated polyesterpolyol poly(meth)acrylates, drying oil-free alkydpolyol poly(meth)acrylates, drying oil-free urethanepolyol poly(meth)acrylates, drying oil-free polyurethanepolyol poly(meth)acrylates, polyamidepolyol poly(meth)acrylates, etherpolyol poly(meth)acrylates, polyetherpolyol poly(meth)acrylates, and mixtures thereof. Typically, the aforesaid amino-functional silicon-containing compound and amine reactive (meth)acrylyl-containing compound are readily reacted simply by blending them at room temperature or at a slightly elevated temperature, for example, up to about 100 degrees Celsius. The reaction of an amine group with a (meth)acrylyl group is often referred to as a Michael addition. Additional illustrative description of of the preparation of such reaction products of amino-functional silicon-containing compounds and amine reactive (meth)acrylyl-containing compounds (such as the poly(meth)acrylates described above) can be found, for example, in U.S. Pat. No. 4,429,082. For convenience, the terms "(meth)acrylyl" and "poly(meth)acrylates" have been used herein to denote either or both of the respective acrylyl and methacrylyl groups and either or both of the respective polyacrylates and polymethacrylates.

The aforesaid reaction products of an amino-functional silicon-containing compound and an amine reactive (meth)acrylyl-containing compound represent a preferred group of organosilicon-containing compounds for the treatment composition utilized in the method of the invention. Particularly preferred are low molecular weight reaction products such as, for example, the reaction product of about 2.0 moles of aminopropyl triethoxy silane and about 1.0 mole of hexanediol diacrylate.

(b) Illustrative organosilicon-containing compounds for the treatment composition include reaction products of an amino-functional silicon-containing compound and a compound containing at least one epoxy group. Examples of suitable amino-functional silicon-containing compounds can be found in part (a) above. Examples of suitable compounds containing at least one epoxy group include the generally known polyglycidyl ethers of polyphenols and the hydrogenated derivatives thereof such as, for example, the diglycidylether of bisphenol-A, the diglycidylether of hydrogenated bisphenol-A, EPON 828 and EPON 1001 (from Shell Chemical Company); butylene oxide; gamma-glycidoxypropyltrimethoxysilane and beta-(3,4-epoxycyclohexyl)ethyltrimethoxysilane; the polyglycidyl ethers of mononuclear polyhydric phenols such as the polyglycidyl ethers of resorcinol, pyrogallol, hydroquinone and pyrocatechol; as well as the polyglycidyl ethers of polyhydric alcohols such as the reaction products of epichlorohydrin or dichlorohydrin with aliphatic and cycloaliphatic alcohols such as ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis(4-hydroxycyclohexyl)propane. Many additional examples of epoxy resins are described in the *Handbook of Epoxy Resins*, Henry Lee and Kris Neville, 1967, McGraw Hill Book Company.

(c) Illustrative organosilicon-containing compounds for the treatment composition include an organosilicon-containing material containing a compound, corresponding to the formula $R\text{-}Si(OR^6)_3$ wherein R independently represents $OR^6$, hydrogen, a $C_1\text{-}C_{10}$ group joined to Si through an Si-C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, a vinyl group, a $-Si(OR^6)_3$ group and/or a halo group, or a $OR^7$ group in which $R^7$ represents alkyl having at least 4 carbon atoms, aryl, alkylaryl, arylalkyl, aryloxyalkyl, or alkyloxyalkyl, and wherein $R^6$ independently represents a $C_1\text{-}C_3$ alkyl group. Partial hydrolysis products of the aforesaid compound corresponding to the formula $R\text{-}Si(OR^6)_3$ also can be employed.

Examples of suitable organosilicon-containing materials include but are not limited to the following (i) through (iv).

(i) Suitable organosilicon-containing materials include organosilicates, including partial hydrolysis products thereof, such as organosilicates corresponding to the following formula (I), $$\underset{\mathrm{Si-(OR^6)_{4-x},\ wherein}}{\overset{(OR^7)_x}{|}} \qquad (\mathrm{I})$$

$R^6$ represents methyl, ethyl or propyl (thus $OR^6$ is a "lower alkoxy" moiety), $R^7$ represents alkyl containing at least 4 carbon atoms, aryl, alkylaryl, arylalkyl, aryloxyalkyl, or alkyloxyalkyl, and x is an integer ranging from 0 to 2, typically 0 or 1, and usually 0.

Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane and the like. Mixtures of organosilicates also may be employed.

Examples of organosilicates, other than the above organosilicates, which may be utilized in the treatment composition include tetraacetoxysilane, diethoxydiacetoxysilane, and

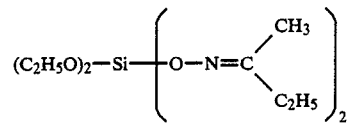

As stated previously the partial hydrolysis products of the organosilicates can be used for the treatment composition. Hydrolyzed organosilicates provide increased reactive groups per molecule. Additionally, the hydrolyzed organosilicates can help provide low volatility to the treatment compositions.

In preparing a partial hydrolysis product, for example, from an organosilicate of formula (I) above, a controlled amount of water typically is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where desired from organosilicates, can be found in formula (IV) infra. The partial hydrolysis product typically will contain greater than 5.0, and usually greater than 8.0, milliequivalents of residual easily hydrolyzable groups per gram of the partial hydrolysis product.

Where desired, organosilicates and/or partial hydrolysis products thereof containing higher alkoxy, aryloxy, arylalkyloxy, alkylaryloxy, alkyloxyalkyloxy, and/or aryloxyalkyloxy moieties attached to one or more silicon atoms in addition to the easily hydrolyzable moieties may be employed for preparation of the treatment compositions. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like.

(ii) Suitable organosilicon-containing materials include nonfunctional organosilanes, including partial hydrolysis products thereof. As used herein, a nonfunctional organosilane is understood to mean a material corresponding to the formula, (II), $$\underset{\mathrm{Si-X_{4-m},\ wherein}}{\overset{R^8_m}{|}} \qquad (\mathrm{II})$$

$R^8$ represents hydrogen, alkyl, vinyl, aryl, aryl, alkylaryl, arylalkyl, or aryloxyalkyl;

X represents $-OR^1$,

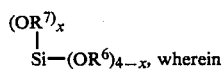

and the monohydroxy and/or cyclic $C_2\text{-}C_3$ residue of a 1,2- or 1,3-glycol, wherein $R^1$ represents $C_1$–$C_3$ alkyl, typically $C_1$–$C_2$ alkyl, and usually methyl, $R^2$ independently represents H or $C_1$–$C_4$ alkyl, $R^3$ and $R^4$ independently represent H, $C_1$–$C_4$ alkyl, $C_6$–$C_8$ aryl and $R^5$ represents $C_4$–$C_7$ alkylene, and m is an integer ranging from 1 to 2, typically 1.

It should be understood that the term "nonfunctional organosilane" wherever appearing herein is used for convenience to distinguish compounds corresponding to the above formula, (II) (nd/or partial hydrolysis products thereof) from those compounds (and/or partial hydrolysis products thereof) referred to herein for convenience as functional organosilanes and corresponding to the formula (III) infra. Thus, although moieties defined by X in formula (II) are easily displaceable by reaction with water and/or alcohol and are therefore necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water typically is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (IV) infra. The partial hydrolysis product typically will contain greater than 5.0, and usually greater than 8.0, milliequivalents of residual easily hydrolyzable groups per gram of the partial hydrolysis product.

Typically, when a nonfunctional organosilane (and/or a partial hydrolysis product thereof) is utilized as organosilicon-containing material, a nonfunctional organosilane corresponding to formula (II) in which X corresponds to —$OR^1$ as defined above is employed.

Examples of nonfunctional organosilanes corresponding to the above formula, (II), include methyl trimethoxy silane, dimethyldimethoxysilane, methyltriethoxysilane, dimethyldiethoxysilane, dimethoxydiphenylsilane, dimethoxymethylphenylsilane, diethoxydipropylsilane, dimethoxydipropylsilane, and the like. Additional examples of the nonfunctional organosilanes include amyltriethoxysilane and triethoxysilane.

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared for example, by reacting a nonfunctional organosilane such as methyltrimethoxysilane (and/or a partial hydrolysis product thereof) with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxydimethoxymethylsilane, isopentoxydimethoxymethylsilane, 2-ethylhexoxydimethoxymethylsilane, 2-butoxyethoxydimethoxymethylsilane, diisodecyloxymethoxymethylsilane, phenoxydimethoxyphenylsilane, toly- loxydimethoxymethylsilane, phenylethyloxydimethoxymethylsilane, and the like. However, when a treatment composition for the method of the invention is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the composition should contain a residual amount of the easily hydrolyzable moieties (Y) from the organosilicon-containing material.

(iii) Suitable organosilicon-containing materials include functional organosilanes, including partial hydrolysis products thereof. As used herein, a "functional organosilane" is intended to include materials corresponding to the following formula, (III), $$F-G-SiX_3, \text{ wherein} \qquad (III)$$

G represents an organo group containing from 2 to 10 carbon atoms,

X represents —$OR^1$,

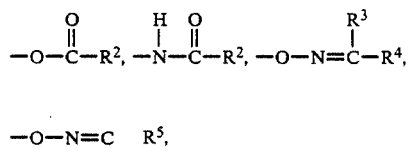

and the monohydroxy and/or cyclic $C_2$–$C_3$ residue of a 1,2- or 1,3-glycol, wherein $R^1$ represents $C_1$–$C_3$ alkyl, typically $C_1$–$C_2$ alkyl, and usually methyl, $R^2$ independently represents H $C_1$–$C_4$ alkyl, $R^3$ and $R^4$ independently represent H, $C_1$–$C_4$ alkyl, $C_6$–$C_8$ aryl and $R^5$ represents $C_4$–$C_7$ alkylene, and F represents amino, polyamino, 1,2-epoxy, mercapto, cyano, urethano, halo, isocyanato, ureido, imidazolinyl, acrylato, methacrylato, vinyl or a group corresponding to —$SiX_3$, wherein X is as defined above.

In accordance with the discussion of the distinction between nonfunctional organosilanes and functional organosilanes as these terms are used herein, groups defined by F above are considered to be the "functional" groups encompassed by the term "functional organosilane." Some examples of functional organosilanes include: gamma-aminopropyltrimethoxysilane, gamma-aminopropyltriethoxysilane, N-beta(aminoethyl)gamma-aminopropyltrimethoxysilane, beta-aminoethyltrimethoxysilane, beta-aminoethyltriethoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylethyldiethoxysilane, $(CH_3O)_3Si$—$(CH_2)_3$—NH—$(CH_2)_2$—NH—$(CH_2)_3$—$Si(OCH_3)_3$, gamma-mercaptopropyltrimethoxysilane, gamma-mercaptopropyltriethoxysilane, gamma-ureidopropyltrimethoxysilane, gamma-ureidopropyltriethoxysilane, gamma-isocyanatopropyltriethoxysilane, vinyl trimethoxy silane, vinyl triethoxy silane, glycidoxypropyltrimethoxysilane, glycidoxypropyltriethoxysilane, 4,5-epoxycyclohexylethyltrimethoxysilane, chloropropyltrimethoxysilane, chloropropyltriethoxysilane, and

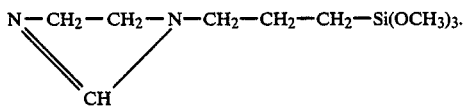

(iv) It is to be understood that mixtures and/or partially hydrolyzed mixtures of (i) the organosilicates (and/or partial hydrolysis products thereof), and/or (ii) the nonfunctional organosilanes (and/or partial hydrolysis products thereof), and/or (iii) the functional organosilanes (and/or partial hydrolysis products thereof) may be employed for the treatment composition.

In preparing a partial hydrolysis product, for example, from a nonfunctional organosilane of formula (II) above, a controlled amount of water is utilized. Generally, the partial hydrolysis product will contain condensation product compounds having one or more siloxane linkages represented by the formula (V),

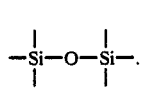 (V)

The hydrolysis and condensation reactions believed to be involved in the preparation of the partial hydrolysis products typically may be illustrated as follows:

[hydrolysis] $R^8—Si—X_3 + H_2O = R^8—Si—(OH)X_2 + HX$, and

[condensation]

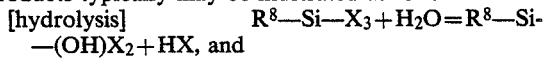

wherein $R^8$ and X are as defined in formula (II) above, X being an easily hydrolyzable group such as, for example, methoxy or ethoxy.

In one method for preparing a preferred partial hydrolysis product, an organosilicon-containing material containing a nonfunctional organosilane corresponding to formula (II) above, such as methyl trimethoxy silane, optionally in combination with an organosilicate corresponding to formula (I) above and/or a functional organosilane corresponding to formula (III) above is employed. The amount of water typically used for preparing a partially hydrolyzed organosilicon-containing material utilized for this method can be determined according to the following formula (IV),

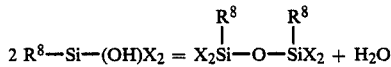

wherein

W represents the total moles of $H_2O$ employed calculated on the total equivalents of the easily hydrolyzable groups from organosilane compounds such as organosilicates, nonfunctional organosilanes, and functional organosilanes, $E_{1,2}$ represents the total number of equivalents of easily hydrolyzable groups from organosilane compounds containing one or two easily hydrolyzable groups, $E_{3,4}$ represents the total number of equivalents of easily hydrolyzable groups from organosilane compounds containing three or four easily hydrolyzable groups, and Z is a number in the range of from 0.023 to 0.43, preferably in the range of from 0.050 to 0.33, and more preferably in the range of from 0.080 to 0.23.

It is to be understood that one equivalent of the hydrolyzable groups corresponds to one mole of the hydrolyzable groups, and one equivalent of water corresponds to ½ mole of water.

For example, just one useful mixture of organosilanes, suitable as organosilicon-containing material for preparation of a partial hydrolysis product, can contain methyl trimethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane, and 0.234 equivalents of methoxy groups from the methyl phenyl dimethoxy silane. Thus in formula (IV) above, $E_{1,2}$ would equal 0.234 and $E_{3,4}$ would equal 4.05; and assuming the maximum moles of water for preparation of the partial hydrolysis product according to formula (IV) (i.e., Z=0.43), the total moles of water for preparation of the partial hydrolysis product would equal 1.86 moles. Or, in other words, a maximum of 1.27 moles of water per mole of organosilane compound (i.e., 1.86 moles/1.468 moles equals 1.27).

Of course, it will be understood that the relative amounts of constituents in a partial hydrolysis product can be adjusted, for example by distilling off a portion, as desired, of volatile constituents from the partial hydrolysis product.

It will be appreciated from the disclosure herein, that the partial hydrolysis product prepared utilizing such a controlled amount of water as determined by formula (IV) above, will contain a mixture of low molecular weight compounds which contain residual easily hydrolyzable groups. The partial hydrolysis product typically will contain greater than 5.0, and usually greater than 8.0, milliequivalents of residual easily hydrolyzable groups per gram of partial hydrolysis product. There is also the possibility that the ungelled partial hydrolysis products prepared utilizing a controlled amount of water as determined from formula (IV) above, also contain a small amount of silanol-type (—Si—OH) hydroxyl groups. However, such partial hydrolysis products generally will contain a ratio of residual easily hydrolyzable groups to silanol-type hydroxyl groups greater than 1.00, and typically greater than 3.00.

The partial hydrolysis of the organosilicon-containing material typically is conducted in the presence of from 0.01 to 20 percent by weight of a catalyst such as gamma-aminopropyl triethoxy silane, isophorone diamine, 2-amino-2-methyl-1-propanol, or the like. The percent by weight of catalyst is based on the total weight of the organosilicon-containing material. Preferred partial hydrolysis products typically contain an amount of easily hydrolyzable groups such that the ratio of the number of grams of the partial hydrolysis product to equivalents of the easily hydrolyzable groups in the partial hydrolysis product is in a range of from 40 to 300, usually in a range of from 50 to 200. In other words, the "hydrolyzable group equivalent weight" of the partial hydrolysis product typically is in a range of from 40 to 300, usually in a range of from 50 to 200.

(d) Illustrative organosilicon-containing compounds for the treatment composition include silanols, such as those having the typical formula $R_{1.00}Si(OH)_{0.40}1.3$ available from Dow Corning Corporation under the tradenames Z-6018, Z-6021 and those having the typical formula $R_{1.67}Si(OMe)_{1.00}O_{0.67}$ available from Dow Corning Corporation under the trademark Sylkyd ® 50, as well as diphenyl silane diol, can be used in the treatment composition for the method of the invention.

To enhance potlife of the compositions containing the organosilicon-containing compounds, where desired, composition compatible materials such as $C_1$–$C_4$ alcohols and materials which easily hydrolyze so as to act as scavengers for water may be combined with the composition. Examples of such easily hydrolyzable composition compatible materials include monomeric organosilicates and organosilanes, or compounds such as ethylorthoformate and 2,2-dimethoxy propane.

Typically, the wood treatment composition includes from about 45 percent to about 98 percent by weight, preferably from about 70 percent to about 95 percent by weight of the treatment composition of an organic solvent as carrier. A wide variety of organic solvents can be utilized such as aliphatic hydrocarbons, aromatic hydrocarbons and halogenated hydrocarbons examples of which include: mineral spirits, n-hexane, cyclohexane, toluene, xylene, chlorobenzene and perchloroethylene. However, it should be appreciated that some of the organosilicon-containing compounds useful in connection with the wood treatment compositions can be used in aqueous, rather than organic solvent borne wood treatment compositions.

In addition to the organosilicon-containing compound, the wood treatment composition optionally may contain between about 0.50 and about 50 percent by weight, more preferably between about 0.50 and about 20 percent by weight, and still more preferably between about 0.50 and about 5.0 percent by weight of the composition of a water repellent. The wood treatment composition also may optionally contain between about 0.55 and about 20 percent by weight, more preferably between about 0.55 and about 6.0 percent by weight, and still more preferably between about 0.55 and about 3.0 percent by weight of a wood preservative. It should be noted that the aforesaid amounts of water repellent and wood preservative are given for the composition at end use. Of course, the percentages would be higher if the composition were in the form of a concentrate. Also, low levels of hiding pigment which can serve as a coloring agent may be incorporated into the treatment composition and/or in a composition such as a transparent stain (for example, applied to the wood substrate separately from the treatment composition). However, if pigment is included in the wood treatment composition and/or in a transparent stain, the amount of pigment should be carefully controlled such that the natural grain and individual surface appearance variations, etc. of the wood substrate remains visible after application and drying. When it is desired to employ a pigment for the purpose of modifying the color of the wood substrate while still allowing the natural grain, etc to remain visible, any pigment compatible with the treatment composition may be employed. Such pigments are well known in the art. When pigment is utilized, typically it is first formed as a concentrate having the consistency of a paste containing the pigment and a suitable grind vehicle. Preferably the grind vehicle is an organosilicon-containing compound, a preferred grind vehicle being the alkoxysilyl-functional compound formed as a reaction product of 1,6-hexanediol diacrylate and gamma-aminopropyltriethoxysilane as described infra. However, any compatible grind vehicle may be used. Further, commercially available predispersed pigments may be incorporated into the wood treatment composition. The amount of pigment present in the pigment paste is determined by the strength of color desired from the ultimate wood treatment composition with due consideration being given to providing for visibility of the natural appearance of the wood but for color modification. The paste may include minor amounts of such components as grinding agents, antisettling agents and solvent. Typically, when pigment is utilized, wood substrate color can be modified while allowing surface visibility when pigment paste is added to the wood treatment composition at a level of from 3 to 10 percent by weight, based on the weight of the wood treatment composition.

Suitable water repellents which can be incorporated in the treatment composition include various materials known in the art for this purpose, such as paraffin wax, polybutene resins such as those available from S and S Chemical Company, Inc., silicone fluids such as that available from Dow Corning Corporation under the tradename $DC_{200}$, silicone polymers such as that available from Dow Corning Corporation under the tradename DC1107, silicone resins such as that available from Union Carbide Corporation under the tradename R270, silicone waxes such as that available from Union Carbide Corporation under the tradename L-49 and poly-oxo-aluminum stearate available as MANALOX 403/60 from Manchem Corporation. It should be understood that high levels of water repellent in the wood treatment composition can interfere with the application of the transparent topcoat to the surface of the treated wood.

Preferred water repellents include an alpha olefin having 20 to 24 carbon atoms, alpha olefin blend, paraffin blend, or a mixture thereof, with the alpha olefin blend being preferred, and are described in U.S. Pat. Nos. 4,360,385 and 4,404,239. The individual cuts of alpha olefin having 20 to 24 carbon atoms are useful, though such cuts are not readily available and are generally less preferred for this reason. The preferred olefin and paraffin blends are characterized by a narrow range of carbon compounds. That is, while paraffins are well known and have been used extensively heretofore, such materials are blends of a wide range of different carbon chain length materials. These commonly used paraffin blends make application of the transparent topcoat difficult and do not provide the good water-repellency efficiencies of the olefin and paraffin compounds described in U.S. Pat. Nos. 4,360,385 and 4,404,239. Narrow cuts of olefin and/or paraffin provide good results in terms of the water-repellency they are able to impart to wood. At least about 50 percent by weight of the olefin blend or paraffin blend comprises compounds having from 20 carbon atoms to 24 carbon atoms. Preferably, the olefin blend and paraffin blend contain at least about 70 percent by weight, and, more preferably, at least about 90 percent by weight of the compounds having between 20 and 24 carbon atoms. The most preferred blend contains at least about 96 percent by weight of the compounds having 20 to 24 carbon atoms and less than about 3 percent by weight of the compounds having less than 20 carbon atoms and less than about 1 percent by weight having more than 24 carbon atoms.

Any of the known compounds which are useful as wood preservatives (such as, for example, biocides, fungicides/ and or algicides) and which are compatible with the other components of the wood treatment composition can be used as the wood preservative herein. Examples of such materials include organic tin compounds such as triphenyl and tributyl tin oxide, chlorinated compounds such as tri-, tetra-, and pentachlorophenol, mono- and dichloro naphthalenes, organic mercury compounds such as phenyl mercury acetate and oleate, 3-iodo-2-propynyl butyl carbamate, Busan 1025 available from Buckman Laboratories, Inc. (a blend of 10 percent, by weight of methylene bis(thiocyanate) and 10 percent by weight 2-(thiocyanomethylthio) benzothiazole in 80 percent by weight solvent), and metal naphthenates such as zinc and copper naphthenates. When utilized, preferably the wood preservative is present in the wood treatment composition at a level of from about 0.55 percent to about 6.0 percent, more preferably from about 0.55 percent to about 3.0 percent, by weight of the composition. Preferably, the wood preservative is present in the wood treatment composition at a level equal to or exceeding the "threshold concentration" of the wood preservative as determined by the NWMA-M-81 soil block test published by the National Wood Window and Door Association.

Film-forming resins have conventionally been used in wood treatment compositions to provide a degree of water-repellency and to aid paint holdout. A minor amount of film-forming resin optionally can be incorporated in the wood treatment compositions for the method of the invention. Suitable film-forming resins are those which do not substantially react with the organosilicon-containing compound. Thus, a substantial amount of the organosilicon-containing compound present in the wood treatment composition is free to penetrate the surface the wood. Examples of such resins include conventional alkyd resins (including urethane alkyd resins), acrylic resins, vinyl resins, epoxy resins, silicone resins, polyester resins and polyurethane resins.

The wood treatment composition optionally can include an organic ionizable compound to provide the wood substrate with a conductive surface prior to the application of the transparent topcoat by electrostatic spraying. Such ionizable compounds provide a conductive surface to the wood substrate which facilitates electrostatic spraying of particles of topcoating having an opposite charge. This method of topcoat application is particularly desirable since very uniform and complete application of a topcoat can be achieved. When utilized, the organic ionizable compound typically would be present in the wood treatment composition at a level of from about 1 percent to about 5 percent, usually at a level of from about 1 to about 3 percent, by weight of the treatment composition. Examples of conventional organic ionizable compounds suitable for this purpose can be found in U.S. Pat. No. 4,404,239.

Other conventional additives optionally may be included in the wood treatment compositions such as surfactants, ultraviolet absorbers (or stabilizers) and topcoat catalysts. Typically, when present, these additives are utilized at a level of less than about 5 percent by weight of the composition.

Because of the nature of wood substrates, of conventional pretreatments, of conventional clear coating systems and of the environmental factors involved in the weathering process, wood protection systems employing conventional clear coatings, even in combination with conventional pretreatments, generally have not been satisfactory with respect to simultaneously providing long term weathering resistance to the wood substrate itself and also long term weathering resistance of the clear coating. Typical manifestations of wood substrate failure include bleaching, discoloration and "grain raising." Typical manifestations of failure of the clear coating itself include, cracking, peeling and lifting from the substrate. As can be appreciated, for example from consideration of the articles referred to above, this objective of achieving simultaneous long term protection of wood from weathering and permitting the natural beauty of the wood substrate to remain readily visible, has been exceptionally difficult and heretofore not achieved. Applicants have discovered that utilization of the method of the present invention involving application of a retreatment composition as previously described in combination with application of a transparent film-forming coating composition having certain characteristics, can result in attainment of this elusive goal.

In the method of the invention, a transparent (or clear) film-forming coating composition containing a film-forming binder component is applied to the wood substrate which has been treated with the aforesaid treatment composition. It is important that the film-forming coating composition, while providing a durable, protective film to the wood substrate, harden or cure on the substrate to provide a transparent finish which allows the underlying appearance (grain, individual surface appearance variation, etc.) of the wood substrate to be readily visible. It is also important that the hardened or cured coating from the film-forming coating composition provide excellent resistance to outdoor weathering conditions with respect to degradation of the transparent film from the coating itself and resistance to delamination from the substrate.

It has been discovered that a transparent, film-forming coating composition suitable for the method of the invention has certain characteristics. A transparent free film from the coating composition retains an elongation of at least 20 percent, preferably at least 50 percent, and more preferably at least 100 percent at the completion of at least 1,000 hours exposure in a Xenon Arc Weatherometer (Model 65-WR from Atlas Electric Devices, Co.). model number, etc.] A transparent, free film from a film-forming coating composition suitable for the method of the invention typically will also retain a tensile strength of at least 2,000 pounds per square inch, preferably at least 4,000 pounds per square inch, after at least 1,000 hours exposure in the Xenon Weatherometer. Examples of film-forming resins which may be utilized as binder for the transparent film-forming coating composition include: polyesters, acrylics, vinyl resins, polyepoxides and polyurethanes. It is preferred that the film-forming resin be essentially free, and preferably completely free, of unsaturated fatty acid or unsaturated derivatives of unsaturated fatty acid such as, for example, unsaturated drying oil. While not intending to be bound by any particular chemical theory, it is believed that the presence of such unsaturation in, for example, conventional clear alkyd coatings and clear drying oil modified urethanes has been at least in part responsible for the failure of transparent films from such clear coating compositions with respect to long term weathering.

Moreover, preferred film-forming resins for the transparent film-forming coating composition for the method of the present invention include one- or two-package polyurethanes, preferably derived from an aliphatic polyisocyanate and an organic polyol selected from the group consisting of a polyester polyol, an acrylic polyol, a hydroxyl-functional polyepoxide (preferably one which is aliphatic) and a polyurethane polyol (preferably one derived from an aliphatic polyisocyanate). A two-package polyurethane coating composition is preferred in which the components of the composition react to form the transparent polyurethane film at the time of application of the composition to the wood substrate. It is particularly preferred that a polyester polyol, particularly an oil-free polyester polyol, be utilized as the organic polyol component.

It has been surprisingly found that utilization of a transparent polyurethane film even having both elongation and tensile strength characteristics as defined above without a pretreatment containing the organosilicon-containing compound, while providing a fair measure of protection to the underlying wood, nevertheless results in deterioration such as bleaching and discoloration of the underlying substrate. However, utilization of such a transparent polyurethane film along with the transparent wood treatment composition, in accordance with the method of the invention, substantially or even completely eliminates such deterioration for a considerably long period of time. It has also been found, for example, when wood which has been treated with the transparent wood treatment composition and topcoated with a conventional, clear coating such as a conventional air-drying urethane, alkyd or spar varnish, that degradation of the clear film itself and deterioration of the underlying wood often occur within as little as one year from the time of application.

The polyisocyanate suitable for reaction with the organic polyol can be any organic polyisocyanate. The polyisocyanate may be aromatic, aliphatic, cycloaliphatic, or heterocyclic and may be unsubstituted or substituted with groups such as halogen, etc. However, aliphatic and cycloaliphatic polyisocyanates are preferred, cycloaliphatic polyisocyanates being particularly preferred because they help to impart resistance to color development in the transparent product films, and they also help to impart a desirable degree of hardness to the product films. Also, diisocyanates are preferred although higher polyisocyanates and monoisocyanates can be used in place of or in combination with diisocyanates. Where polyisocyanates having an isocyanato functionality higher than 2 are utilized, some reactive material to reduce the fractionality of the polyisocyanate may be used, for example, alcohols and amines known for use for this purpose. Many organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; 1,4-phenylene diisocyanate; 1,3-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; alpha,alpha-xylylene diisocyanate; 4,4'-methylene-bis-(cyclohexyl isocyanate); ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates nd monoisocyanates may be utilized as the polyisocyanate component.

Polyester polyols can be prepared by well known techniques involving the reaction of simple diols, triols and higher hydric alcohols (optionally in combination with monohydric alcohols) with polycarboxylic acids. Examples of the simple diols, triols, and higher hydric alcohols include: ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; the alkoxylation product of 1 mole of 2,2-bis(4-hydroxyphenyl)propane (i.e., bisphenol-A) and 2 moles of propylene oxide available as DOW-565 from DOW Chemical Company; dimethyl hydantoin diols; isocyanuric acid triols; and the like. Of the above simple diols, triols and higher hydric alcohols, diols are preferred. Examples of polycarboxylic acids for preparation of polyester polyols include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol. Polyester polyols also include those prepared by reacting an alkylene oxide such as ethylene oxide, propylene oxide, butylglycidyl ether and the glycidyl esters of organic acids such as CARDURA-E, with the carboxylic acid to form the corresponding ester. It is preferred to utilize diols for the preparation of the polyester polyols.

Examples of the optional monohydric alcohols which may be used to prepare the polyester polyols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

Acrylic polyols include but are not limited to the known hydroxyl-functional addition polymers and copolymers of acrylic and methacrylic acids and their ester derivatives including but not limited to their hydroxyl functional ester derivatives (particularly those having 2 to 6 carbon atoms in the alkyl group), acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate. Additional examples of compounds which may be employed in the preparation of acrylic polyols include: compounds produced by the reaction of lactones such as caprolactone with hydroxyl functional acrylic esters such as hydroxy ethyl acrylate and hydroxy propyl acrylate; epoxy-esters produced by the reaction of saturated fatty acids, especially monocarboxylic saturated fatty acids, with ethylenically unsaturated epoxides such as glycidyl acrylate and glycidyl methacrylate; and free radical addition copolymers of acrylic monomers such as those described previously herein with ethylenically unsaturated anhydrides such as maleic anhydride in which the anhydride rings are reacted with a polyol such as a low molecular weight diol.

Where desired, various other unsaturated monomers can be employed in the preparation of acrylic polyols, examples of which include: vinyl aromatic hydrocarbons such as styrene, alpha-methyl styrene, and vinyl toluene; vinyl acetate; vinyl chloride; and unsaturated epoxy functional monomers such as glycidyl (meth)acrylate. For convenience, the term "(meth)acrylate" has been used herein to denote either or both of the respective acrylate compound and the respective methacrylate compound.

Hydroxyl-functional polyepoxides (or epoxy polyols) can be prepared by generally known techniques such as, for example, by the reaction of glydicyl ethers of polyphenols such as the diglycidyl ether of 2,2-bis (4-hydroxyphenyl) propane, with polyphenols such as 2,2-bis(4-hydroxyphenyl) propane. Epoxy polyols of varying molecular weights and average hydroxyl functionality can be prepared depending upon the ratio of starting materials used. It is preferred that the epoxy polyols be derived from aliphatic rather than aromatic components such as by use of the hydrogenated derivatives of polyphenols such as the hydrogenated derivatives of 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; and 1,5-dihydroxynaphthalene. Epoxy polyols derived from aliphatic components also include those prepared utilizing the polyglycidyl ethers of polyhydric aliphatic alcohols such as ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis(4-hydroxycyclohexyl)propane.

Polyurethane polyols can be prepared by reacting any of the above-mentioned polyols with a minor amount of organic polyisocyanate (ratio of equivalents OH to equivalents NCO is greater than 1) so that free hydroxyl groups are present in the product. In addition to the higher molecular weight polyols mentioned above, mixtures of both high molecular weight and low molecular weight polyols may be utilized. Examples of the low molecular weight polyols include the simple diols, triols and higher hydric alcohols illustrated above in the discussion of polyester polyols. Also, acid-containing polyols such as dimethylolpropionic acid can also be used.

The molecular weight nd hydroxyl equivalent weight of suitable organic polyols for reaction with the organic isocyanates to form transparent polyurethane films on the wood substrate can vary within wide limits depending on the nature of the specific classes of polyols as described above chosen for preparation of the transparent films. However, as discussed above, a transparent free film from the coating composition should retain an elongation of at least 20 percent, preferably at least 50 percent, and more preferably at least 100 percent at the completion of at least 1,000 hours exposure in a Xenon Weatherometer. Also, as discussed above, a transparent, free film from the coating composition typically will retain a tensile strength of at least 2,000 pounds per square inch, preferably at least 4,000 pounds per square inch, after at least 1,000 hours exposure in the Xenon Weatherometer.

Wood substrates suitable for use in the method of the invention include solid wood substrates and wood composites examples of which include: hardwood, softwood, plywood, wood veneer, particle board, chipboard and fiberboard. The treatment composition and film-forming coating composition can be applied to such substrates by any method such as dipping, flow coating, roll coating, brushing and spraying.

In a first embodiment of the invention, the transparent wood treatment composition is applied directly to the wood substrate followed by application of the transparent film-forming coating composition. The transparent wood treatment composition typically substantially penetrates the wood surface. It does not form a distinct, continuous film on the surface of the wood. Preferred wood treatment compositions, when applied to the surface of a cleaned, untreated Eastern white pine block, penetrate the surface of the pine block to the extent of at least about two, and more preferably, at least about three, cell layers. Each cell layer in such a block is approximately 50 micrometers (2 mills) thick.

In a second embodiment, prior to applying the transparent wood treatment composition as described above, a wood preserving composition is first applied to the wood substrate comprising (a) from about 1 percent to about 50 percent by weight of a water repellent selected from the group consisting of an alpha olefin having 20 to 24 carbon atoms and a narrow cut alpha olefin blend stably dispersed in the wood preserving composition, (b) from about 0.55 percent to about 6.0 percent by weight of a wood preservative stably dispersed in the wood preserving composition, and (c) about 25 percent to about 95 percent by weight of a carrier for components (a) and (b).

In a third embodiment, the transparent wood treatment has been modified as discussed above to also serve as a stain which also substantially penetrates the wood surface and does not form a distinct, continuous film on the surface of the wood.

In a fourth embodiment, a stain is separately applied to the wood substrate either before or after the application of the transparent wood treatment composition and before application of the transparent film-forming coating composition. The stain substantially penetrates the wood surface and does not form a distinct, continuous film on the surface of the wood.

Given the disclosure herein, further embodiments of the method of the invention will be apparent.

The method of the invention provides a wood substrate having firmly adhered thereto a dried, transparent treatment containing the organosilicon-containing compound and above, and firmly adhered to the substrate, a transparent film from the transparent film-forming coating composition.

The following examples illustrate the invention and are not to be construed as limiting it to their details. As used herein, "pbw" means "parts by weight." All parts and percentages in the examples and throughout the specification are by weight unless specifically indicated otherwise.

EXAMPLE 1

This example illustrates the preparation of an organosilicon-containing compound having at least one hydrolyzable silyl group, which compound is used in the transparent stain of Example 5 and the wood treatment of Example 6.

A reaction vessel is charged with 442 pbw of gamma-aminopropyl triethoxysilane (obtained as A-1100 from Union Carbide Co.) and provided with a nitrogen blanket. Next, 237.3 pbw of hexanediol diacrylate are slowly added to the charge. The molar ratio of silane to hexanediol diacrylate is 2:1.05. The addition of the hexanediol diacrylate to the reaction vessel causes the contents of the vessel to exotherm to about 60° Celsius (°C.). The resulting product contains approximately 90 percent by weight solids as measured for 1 hour at 110° C.

EXAMPLE 2

This example illustrates the preparation of an organosilicon-containing compound having at least one hydrolyzable silyl group, which compound is used in the wood treatment of Example 7.

The product organosilicon-containing compound is prepared by mixing 2550 pbw methyltrimethoxy silane, 450 pbw gamma-aminopropyl triethoxysilane and 161.4 pbw deionized water, letting the mixture stand for a week and thereafter distilling off the alcohol by-products of the reaction.

EXAMPLE 3

This example illustrates the preparation of a transparent polyurethane film-forming coating composition (topcoat) containing an aliphatic polyisocyanate and an organic polyol.

(a) A polyester polyol is prepared by reacting 342 pbw of Tone 0301 polyol (a reaction product of trimethylolpropane and caprolactone obtained as Tone 0301 polyol from Union Carbide), with 107 pbw of azelaic acid, using 0.46 pbw of p-toluene sulfonic acid as catalyst and 23.8 pbw of cyclohexane as solvent. The resulting polyester polyol contains 98 percent by weight solids, has a Gardner-Holdt bubble tube viscosity at ambient temperature of Z6-, has an acid value of less than 1, and has a hydroxyl equivalent weight of between 220 and 260.

(b) A dispersion of the polyester polyol is prepared by mixing 232 pbw of the polyester polyol of part (a) immediately above, 6.47 pbw of bis(1,2,2,6,6-pentamethyl-4-piperidinyl) sebacate (an ultraviolet light absorber obtained as TINUVIN® 292 from Ciba-Geigy Corp.), 6.47 pbw of 2(2'-hydroxy-3'5'-di-tert-amyl phenyl) benzotriazole (an ultraviolet light absorber obtained as TINUVIN® 328 from Ciba-Geigy), 5 pbw xylene, and 35 pbw ethylene glycol monopropylether acetate.

(c) A composition containing an aliphatic polyisocyanate is prepared from the following components: 126 pbw of a 1,6-hexamethylene diisocyanate-based adduct (obtained as L2291 from Mobay Chemical Corp.), 112.2 pbw of an isocyanurate from isophorone diisocyanate (obtained as T1890 from Huels Corp.), 1.0 pbw of dibutyltin dilaurate, 105 pbw of ethylene glycol monopropyl ether acetate, and 46 pbw of xylene. The isocyanates are mixed in a vessel and blended until the composition is clear. At this time, the xylene and ethylene glycol monopropyl ether acetate are added to the composition. Next, the dibutyltin dilaurate is added to the composition.

To prepare the transparent polyurethane film-forming coating composition, the polyester polyol dispersion of part (b) immediately above and the composition containing the aliphatic polyisocyanate are mixed together in a ratio of equivalent weights of 1:1. These components of the polyurethane film-forming coating composition are mixed, and reacted together, to form the transparent polyurethane film-forming coating composition at the time the coating composition (topcoat) is to be applied to a solid, wood substrate.

EXAMPLE 4

This example illustrates the preparation of a pigment paste used in the preparation of the transparent stain of Example 5.

The pigment paste is prepared by grinding 180.0 pbw of brown pigment (Manganese Antimony Titanium Buff Rutile obtained as 10364 Brown from Drakenfeld Co.) with the following components: 100.0 pbw of the product organosilicon-containing compound of Example 1, 1.0 pbw of silicon fluid (obtained as SF-1023 from General Electric Co.), 2.0 pbw of a grinding agent (obtained as Anti Terra U from Byk-Chemie USA), 1.0 pbw of an antisettling agent (obtained as M-P-A® 2000X from NL Chemicals), 7.0 pbw of ethylene glycol monopropylether acetate, and 3.0 pbw of xylene.

EXAMPLE 5

A transparent stain is prepared by blending 75 pbw of toluene, 20 pbw of the product organosilicon-containing compound of Example 1, and 5 pbw of the pigment paste of Example 4.

EXAMPLE 6

A wood treatment composition is prepared by blending 20.0 pbw of the product organosilicon-containing compound of Example 1 with 80.0 pbw of toluene.

EXAMPLE 7

A wood treatment composition is prepared by blending 20 pbw of the product organosilicon-containing compound of Example 2 with 80 pbw of toluene.

EXAMPLE 8

This example compares long-term durability against weathering for pine boards prepared according to the method of the invention with that for pine boards prepared by a comparative process.

(a) A first set of pine boards is treated with a water repellent wood preservative solution as described in Example 2 of U.S. Pat. No. 4,404,239. After 24 hours, the pine boards are stained[1] and thereafter topcoated with the transparent polyurethane film-forming coating composition of Example 3.

(b) A second set of pine boards is treated with the wood treatment composition of Example 6 by dipping the boards in the composition for 30 seconds. After 24 hours, the boards are stained[1] and thereafter topcoated with the transparent polyurethane film-forming coating composition of Example 3.

(c) Both sets of boards are placed on an exposure rack in Florida, United States of America, facing south at a 45 degree angle. After 2½ years, the first set of boards (the comparative set) show mildew and wood deterioration under the clear topcoat while the second set of boards (prepared according to the invention) show no wood or topcoat failure.

[1] The stain is made by mixing 20 pbw of a tint base with 668.16 pbw of other ingredients. The tint base consists of 207.7 pbw of the polyester polyol of part (a) of Example 3, 1.01 pbw of M-P-A ® 2000X as described in Example 4, 1.01 pbw of SF-1023 as described in Example 4, 1.01 pbw of Anti Terra U as described in Example 4, and 101.0 pbw of shown pigment as described in Example 4. The other ingredients consist of 207.7 pbw of the polyester polyol of part (a) of Example 3, 6.09 pbw of TINUVIN ® 292 and 6.09 pbw of TINUVIN ®328 as described in part (b) of Example 3, 62.9 pbw of xylene, 146.77 pbw of propylene glycol monomethylether acetate, 126 pbw of L2291 isocyanate as described in part (c) of Example 3, 112 pbw of T1890 as described in part (c) of Example 3, and 0.61 pbw of dibutyltin dilaurate. The stain is brushed on the substrate and wiped off after 5 minutes.

EXAMPLE 9

This example compares long-term durability against weathering for boards of Douglas Fir prepared according to methods of the invention (parts b through e) with that for a board of Douglas Fir prepared by a comparative process (part a).

(a) A first board of Douglas Fir is treated with a water repellent wood preservative solution as described in Example 2 of U.S. Pat. No. 4,404,239. After 24 hours, the board is stained (as described in footnote 1 to Example 8) and thereafter topcoated with the transparent polyurethane film-forming coating composition of Example 3.

(b) A second board of Douglas Fir is treated with a water repellent wood preservative solution as described in Example 2 of U.S. Pat. No. 4,404,239. After 24 hours, the second board is stained with the transparent stain of Example 5 and thereafter topcoated with the transparent polyurethane film-forming coating composition of Example 3.

(c) A third board of Douglas Fir is treated with a water repellent wood preservative solution as described in Example 2 of U.S. Pat. No. 4,404,239 except that 20 pbw of the organosilicon-containing compound of Example 1 is substituted for the alkyd resin. Moreover, 5 pbw of the pigment paste of Example 4 also is added, and solvent is removed from the wood preservative solution to accommodate these other ingredients. After 24 hours, the board is topcoated with the transparent polyurethane film-forming coating composition of Example 3.

(d) A fourth board of Douglas Fir is treated in the same manner with the same water repellent wood preservative solution as used in part (c) immediately above except that the 5 pbw of the pigment paste is not added. After 24 hours, the board is further stained with the transparent stain of Example 5, dried and thereafter topcoated with the transparent polyurethane film-forming coating composition of Example 3.

(e) A fifth board of Douglas Fir is treated with the wood treatment composition of Example 7 and allowed to dry for 24 hours before topcoating with the transparent polyurethane film-forming coating composition of Example 3.

(f) All of the boards of parts (a) through (e) immediately above are placed on an exposure rack in Florida, U.S.A., facing south at a 45 degree angle. After to years, the board prepared according to the comparative process of part (a) immediately above exhibits delamination of the topcoat and bleaching of the wood whereas the boards of parts (b) through (e), prepared according to the method of the invention, exhibit no delamination of the topcoat and no wood degradation (such as bleaching).

EXAMPLE 10

This example compares durability against weathering for boards of Douglas Fir prepared according to methods of the invention (parts b and c) with that for a board of Douglas Fir prepared by a comparative process (part a).

(a) A first board of Douglas Fir is treated with a water repellent wood preservative solution as described in Example 2 of U.S. Pat. No. 4,404,239. After 24 hours, the board is stained with a commercially available walnut-colored transparent stain (obtained as REZ ® 77-709 from PPG Industries, Inc.) and thereafter topcoated with a commercially available urethane-alkyd clear varnish (obtained as REZ ® 77-5 from PPG Industries, Inc.).

(b) A second board of Douglas Fir is treated with a water repellent wood preservative solution as described in Example 2 of U.S. Pat. No. 4,404,239 except that 20 pbw of the product organosilicon-containing compound of Example 1 is substituted for the alkyd resin. After 24 hours, the board is stained with a commercially available walnut-colored transparent stain (obtained as REZ ® 77-709 from PPG Industries, Inc.) and thereafter topcoated with the transparent polyurethane film-forming coating composition of Example 3.

(c) A third board of Douglas Fir is treated with a water repellent wood preservative solution as described in Example 2 of U.S. Pat. No. 4,404,239 except that 20 pbw of the product organosilicon-containing compound of Example 1 is substituted for the alkyd resin. Moreover, 5 pbw of the pigment paste of Example 4 also is added, and solvent is removed from the wood preservative solution to accommodate these other ingredients. After 24 hours, the board is stained with a commercially available walnut-colored transparent stain (obtained as REZ ® 77-709 from PPG Industries, Inc.) and thereafter topcoated with the transparent polyurethane film-forming coating composition of Example 3.

(d) The boards of parts (a) through (c) immediately above are placed on an exposure rack in Florida, U.S.A., facing south at a 45 degree angle. After one year, the board prepared according to the comparative process of part (a) immediately above exhibits complete failure by cracking and delamination of the topcoat and bleaching and degradation of the wood, whereas the boards of parts (b) and (c), prepared according to the method of the invention, exhibit no signs of failure.

EXAMPLE 11

This example compares durability against weathering for a pine board prepared according to a method of the invention (part a) with that for pine boards prepared by comparative processes (parts b and c).

(a) A first pine board is treated with the wood treatment composition of Example 6 by dipping the board in the composition for 30 seconds. After 24 hours, the board is stained with the transparent stain of Example 5 and thereafter topcoated with the transparent polyurethane film-forming coating composition of Example 3.

(b) A second pine board is treated with a water repellent wood preservative solution as described in Example 2 of U.S. Pat. No. 4,404,239. After 24 hours, the board is topcoated with the transparent polyurethane film-forming coating composition of Example 3.

(c) A third pine board is treated with a water repellent wood preservative solution as described in Example 2 of U.S. Pat. No. 4,404,239. After 24 hours, the board is topcoated with a commercially available urethane-alkyd clear varnish (obtained as REZ® 77-5 from PPG Industries, Inc.).

(d) The pine boards of parts (a) through (c) immediately above are placed on an exposure rack in Florida, U.S.A., facing south at a 45 degree angle. After one year and nine months, the board prepared according to the comparative process of part (c) immediately above exhibits complete failure by cracking and delamination of the topcoat and degradation of the wood. After the same period of time, the board prepared according to the comparative process of part (b) immediately above exhibits some mildew spotting on the wood as well as bleaching of the wood under the topcoat, but no failure of the topcoat. The board of part (a), prepared according to the method of the invention, exhibits no signs of failure of either the wood or the topcoat.

EXAMPLE 12

This example compares durability against weathering for Oak sill parts prepared according to the method of the invention (part a) with that for such sill parts prepared by a comparative process (part b).

(a) A sill part is treated with a water repellent wood preservative solution as described in Example 2 of U.S. Pat. No. 4,404,239 except that 20 pbw of the product organosilicon-containing compound of Example 1 is substituted for the alkyd resin. After 24 hours, the part is topcoated with the transparent polyurethane film-forming coating composition of Example 3.

(b) A sill part is coated with a commercially available urethane-alkyd clear varnish (obtained as REZ® 77-5 from PPG Industries, Inc.).

(c) The sill parts of parts (a) and (b) immediately above are placed on an exposure rack in Florida, U.S.A., facing south at a 45 degree angle. After seven months, the sill part prepared according to the comparative process of part (b) immediately above exhibits complete failure by cracking of the topcoat and deterioration of the wood. After the same period of time, the sill part of part (a), prepared according to the method of the invention, exhibits no signs of failure of either the wood or the topcoat.

EXAMPLE 13

This example compares durability against weathering for wood panels of Pine, Moabi and Merenti woods prepared according to methods of the invention (parts b and c) with that for similar panels prepared by comparative processes (parts a and d).

(a) A first set of panels (except for the panel of Moabi)* is treated with a water repellent wood preservative solution as described in Example 2 of U.S. Pat. No. 4,404,239. After 24 hours, all of the panels are topcoated with the transparent polyurethane film-forming coating composition of Example 3.

* Moabi wood is inherently sufficiently resistant to weathering that it does not need to be treated with the wood preservative solution and, accordingly, is simply topcoated.

(b) A second set of panels is treated with the wood treatment composition of Example 6 by dipping the board in the composition for 30 seconds, dried for 24 hours, and thereafter topcoated with the transparent polyurethane film-forming coating composition of Example 3.

(c) A third set of panels is stained with the transparent stain of Example 5, dried for 24 hours, and thereafter topcoated with transparent polyurethane film-forming coating composition of Example 3.

(d) A fourth set of panels is stained with solvent based, yellow, alkyd stain (obtained as No. 702-1-021 from Peintures Corona, France), dried for 24 hours, and thereafter topcoated with the transparent polyurethane film-forming coating composition of Example 3.

(e) Next, each of the panels of parts (a) through (d) immediately above is damaged by driving nails into its face and thereafter removing them and also by cutting the coating in a cross-hatch pattern. The panels are placed on an exposure rack in Florida, U.S.A., facing south at a 45 degree angle. After one year, the panels prepared according to the comparative processes of parts (a) and (d) immediately above exhibit bleaching and degradation of the wood as well as delamination of the topcoat in the damaged areas. After the same period of time, the panels of parts (b) and (c), prepared according to the method of the invention, exhibit little to no bleaching or degradation of the wood and no problems with respect to adhesion of the topcoat at the damaged areas.

What is claimed is:

1. A method of providing a wood substrate with durability against weathering comprising:
   (A) applying to said wood substrate a transparent treatment comprising an organosilicon-containing compound having at least one hydrolyzable silyl group in a carrier for said compound; and thereafter
   (B) coating said wood substrate with a transparent, film-forming, coating composition containing components comprising an aliphatic polyisocyanate and an organic polyol whereby said components of said coating composition react to form a polyurethane film, characterized in that a transparent free film from said coating composition retains an elongation of at least 20 percent and a tensile strength of at least 2,000 pounds per square inch after at least 1,000 hours exposure in a Xenon Weatherometer.

2. The method of claim 1 wherein said organic polyol is selected from the group consisting of a polyester polyol, an acrylic polyol, a hydroxyl-functional aliphatic polyepoxide and a polyurethane polyol derived from an aliphatic polyisocyanate.

3. The method of claim 2 wherein said organic polyol is a polyester polyol.

4. The method of claim 1 wherein said hydrolyzable silyl group is selected from the group consisting of —OR¹,

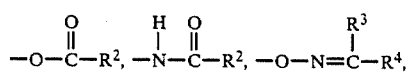

and the monohydroxy
and/or cyclic $C_2$-$C_3$ residue of a 1,2- or 1,3-glycol, wherein
$R^1$ represents $C_1$-$C_3$ alkyl,
$R^2$ represents H or $C_1$-$C_4$ alkyl,
$R^3$ and $R^4$ independently represent H, $C_1$-$C_4$ alkyl, or $C_6$-$C_8$ aryl and
$R^5$ represents $C_4$-$C_7$ alkylene.

5. The method of claim 4 wherein said hydrolyzable silyl group represents —$OR^1$ wherein $R^1$ is a $C_1$-$C_3$ alkyl group.

6. The method of claim 1 wherein said organosilicon-containing compound comprises a reaction product of an amino-functional silicon-containing compound and an amine reactive acrylyl-containing compound.

7. The method of claim 6 wherein said hydrolyzable silyl group represents —$OR^1$ wherein $R^1$ is a $C_1$-$C_3$ alkyl group.

8. The method of claim 1 wherein prior to applying said transparent treatment, applying a wood preserving composition to said wood substrate comprising (a) from about 1 percent to about 50 percent by weight of a water repellent selected from the group consisting of an alpha olefin having 20 to 24 carbon atoms and a narrow cut alpha olefin blend stably dispersed in said wood preserving composition, (b) from about 0.55 percent to about 6.0 percent of a wood preservative stably dispersed in said wood preserving composition, and (c) from about 25 percent to about 95 percent of a carrier for components (a) and (b).

9. A wood substrate having firmly adhered thereto a material comprising:
(A) a dry layer of a transparent treatment comprising an organosilicon-containing compound having at least one hydrolyzable silyl group; and immediately above and firmly adhered to said dry layer
(B) a transparent film from a film-forming, coating composition containing components comprising an aliphatic polyisocyanate and an organic polyol whereby said components of said coating composition react to form a polyurethane film, characterized in that a transparent free film from said coating composition retains an elongation of at least 20 percent and a tensile strength of at least 2,000 pounds per square inch after at least 1,000 hours exposure in a Xenon Weatherometer.

10. The wood substrate of claim 4 wherein said organic polyol is selected from the group consisting of a polyester polyol, an acrylic polyol, a hydroxyl-functional aliphatic polyepoxide and a polyurethane polyol derived from an aliphatic polyisocyanate.

11. The wood substrate of claim 10 wherein said organic polyol is a polyester polyol.

12. The wood substrate of claim 9 wherein said hydrolyzable silyl group is selected from the group consisting of —$OR^1$,

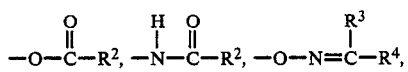

and the monohydroxy
and/or cyclic $C_2$-$C_3$ residue of a 1,2- or 1,3-glycol, wherein
$R^1$ represents $C_1$-$C_3$ alkyl,
$R^2$ represents H or $C_1$-$C_4$ alkyl,
$R^3$ and $R^4$ independently represent H, $C_1$-$C_4$ alkyl, or $C_6$-$C_8$ aryl and
$R^5$ represents $C_4$-$C_7$ alkylene.

13. The wood substrate of claim 12 wherein said hydrolyzable silyl group represents —$OR^1$ wherein $R^1$ is a $C_1$-$C_3$ alkyl group.

14. The wood substrate of claim 9 wherein said organosilicon-containing compound comprises a reaction product of an amino-functional silicon-containing compound and an amine reactive acrylyl-containing compound.

15. The wood substrate of claim 14 wherein said hydrolyzable silyl group represents —$OR^1$ wherein $R^1$ is a $C_1$-$C_3$ alkyl group.

16. The wood substrate of claim 9 having immediately beneath said dry layer of transparent treatment, and in firm adherence thereto, a dry layer of a wood preserving composition from components comprising (a) from about 1 percent to about 50 percent by weight of a water-repellent selected from the group consisting of an alpha olefin having 20 to 24 carbon atoms and a narrow cut alpha olefin blend stably dispersed in said wood preserving composition, (b) from about 0.5 percent to about 6.0 percent of a wood preservative stably dispersed in said wood preserving composition, and (c) from about 25 percent to about 95 percent of a carrier for components (a) and (b).

* * * * *

UNITED STATES PATENT AND TRADEMARK OFFICE
CERTIFICATE OF CORRECTION

PATENT NO. : 4,913,972

DATED : April 3, 1990

INVENTOR(S) : John F. Grunewalder, Mark A. Harley, Alan J. Kaylo and Paul J. Prucnal It is certified that error appears in the above-identified patent and that said Letters Patent is hereby corrected as shown below:

On the title page, Item [56]:

In the References Cited, first page, first column, 5th patent, "Kunia" should read --Kania--.

In the References Cited, first page, second column, line 3, "Timer" should read --Timber--.

In the Abstract, first page, line 3, "appying" should read --applying--.

In the Claims, column 25, line 29, "water repellent" should read --water-repellent--.

In the Claims, column 26, line 1, "claim 4" should read --claim 9--.

Signed and Sealed this

Tenth Day of August, 1993

Attest:

MICHAEL K. KIRK

*Attesting Officer*    Acting Commissioner of Patents and Trademarks